May 23, 1961 J. H. WILLIAMS ET AL 2,985,216
METHOD OF AND APPARATUS FOR APPLYING IDENTIFYING
MARKINGS TO VEHICLE TIRES
Filed Feb. 19, 1958
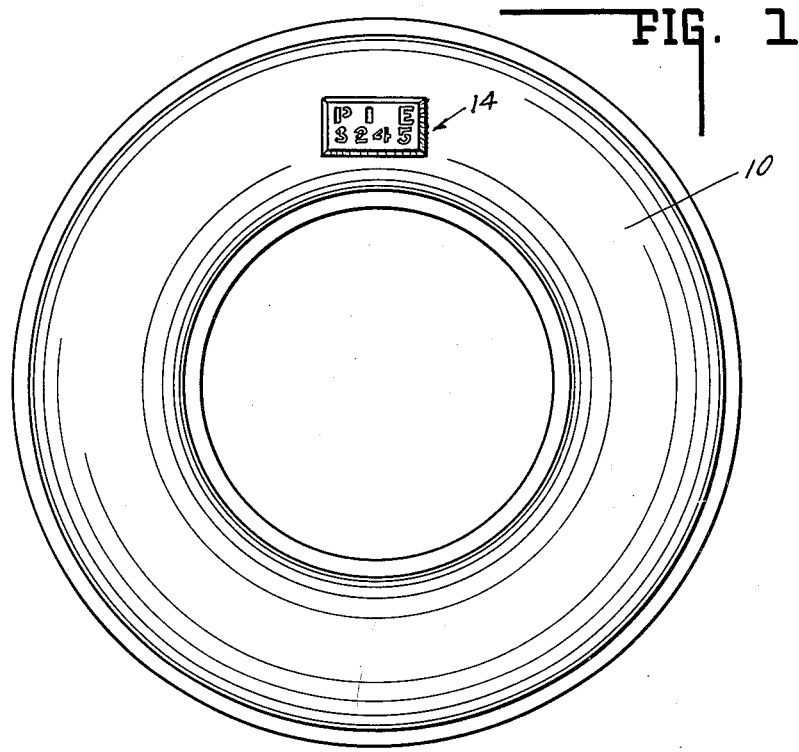
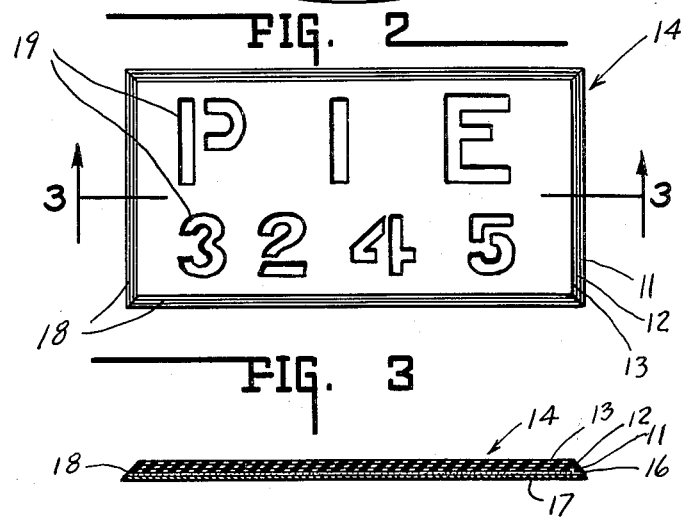
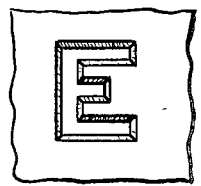
INVENTORS.
JAMES H. WILLIAMS.
ROBERT G. WILLIAMS.
BY
Lockwood, Galt, Woodard & Smith
ATTORNEYS.

2,985,216

METHOD OF AND APPARATUS FOR APPLYING IDENTIFYING MARKINGS TO VEHICLE TIRES

James H. Williams, Old Rushville Road, and Robert G. Williams, 110 Fairfield Drive, both of Shelbyville, Ind.

Filed Feb. 19, 1958, Ser. No. 716,055

1 Claim. (Cl. 152—330)

This invention relates generally to a method of and apparatus for applying identifying markings on articles such as vehicle tires, and in particular to an identification applique which may be conveniently applied at a location on the article which facilitates visual inspection.

In the commercial operation of vehicles such as autos and trucks, it is often desirable to provide marking for each of the vehicle tires to discourage unauthorized replacement or transfer thereof. Auto rental agencies, for example, have particular need for permanently providing each tire of autos which are leased with identification marking, this being because of the danger of unauthorized tire interchange or substitution while the autos are beyond the agency's control for an extended period. Further, public service commissions in many states require that trucking companies apply a variety of identifying indicia to trucks and trailers operating across their particular states. These requirements make additionally desirable an inexpensive, convenient means of vehicle marking.

While tire manufacturers supply each tire produced with a serial number, this number, usually of many digits, is quite small in dimension and difficult to read. In those instances where dual tires are used on trucks or trailers, and the tires are mounted on wheels spaced only a slight distance apart, they may be so disposed as to be impossible to read without unmounting one of the wheels.

It is the principal object of the present invention, therefore, to provide a conveniently visible identification marking for articles such as vehicle tires, which is inexpensive and easily applied, and becomes a permanent part of the tire by vulcanization.

A further object of the present invention is to provide an identifying applique which can be applied to a vehicle tire even after it has been mounted on the vehicle wheel, and which may be applied to it at a location wherein visual inspection may be conveniently performed.

A further object of the present invention is to provide a marking applique for identifying vehicle tires wherein an identifying legend is had by margins of windows through the applique affording a color contrast between the tire showing through the windows and the applique itself serving to make the legend clearly visible.

A further object of the present invention is to provide a marking applique of the type referred to above in which identifying letters or numerals may be formed by marginal beveled cuts or perforations in a multi-colored, laminated blank, the contrasting colors of the laminations thereby providing a border around the letters or numerals.

A further object of the present invention is to provide a method for applying applique permanent identifying markings such as carried by and to articles, particularly vehicle tires, the method permitting application of the marking at any desired location on the tire after it is mounted on a vehicle wheel, and further, avoiding all mutilation of the tire wall such as has been heretofore the case when the identifying indicia was burned into the tire wall.

The full nature of the invention will be understood from the accompanying drawings and the following description and claim:

Fig. 1 is a side view of a mounted tire showing the marking applique of the present invention in place thereon.

Fig. 2 is an enlarged front view of an applique embodying the present invention.

Fig. 3 is a sectional view taken generally along the line 3—3 of Fig. 2.

Fig. 4 is a fragmentary view similar to Fig. 2, but illustrating the perforations as being formed with beveled margins.

As may be seen in Fig. 1, the applique embodying the present invention may be applied at any convenient location on the tire casing 10. As previously mentioned, the applique may be applied either before or after the tire is mounted on the vehicle. The applique itself is formed from a pad of laminations, as indicated at 11, 12 and 13 in Fig. 2. The laminations may each be of a contrasting color, for example, the lamination 11 may be red in color, the lamination 12 may be white and lamination 13 may be yellow. The laminations are formed of natural or synthetic rubber and are vulcanized one to the other so as to form an integral pad or blank indicated generally at 14.

As may be seen in Fig. 3, the relative under or back side of the pad is provided with a raw surface of vulcanizable rubber latex 16 which is normally covered with a removable layer of Holland cloth 17, or similar fabric. The cloth serves the purpose of protecting the raw surface prior to use of the applique and is stripped therefrom just prior to application of the applique to the tire surface. The back side surface constitutes a layer of rubber material vulcanizable within the range of atmospheric temperatures and, in this sense, is pressure sensitive.

The raw surface provided on the applique has the property of being cold-vulcanizing in the sense that when the applique is pressed by hand pressure onto a cleaned surface of the tire intermediate the tread and rim, it eventually becomes an integral part of the tire and cannot thereafter be removed except by abrading or buffing it away, leaving a tell-tale tire surface indicating the removal. The applique preferably has its margins beveled, although not necessarily so, as indicated at 18 in Figs. 2 and 3. This aids in preventing scuffing off the applied plaque by scraping the tire wall against curbs and the like when the vehicle is being parked, for example. Then if color contrast of the laminations is employed, a conspicuous outline is provided thereby. The applique is completed by cutting through the pad in a configuration or configurations which produce or produces by the margins of the cuts the desired identifying indicia such as numerals or letters, as indicated at 19 in Fig. 2.

An area of the outside of the tire wall, slightly exceeding that of the applique (which of course may be made in varying sizes) is buffed and then its surface is prepared further by applying a rubber solvent to dissolve a surface layer, following which the solvent and rubber carried thereby is scraped off to leave a substantially nonoxidized surface. In referring to the term "tire," it is to be understood that this invention applies either to the tubeless tire or to the tire casing when a tube is employed.

The applique may then be applied to that cleaned tire surface by removing the protective fabric from over the vulcanizable surface of the applique, and pressing it over the cleaned area of the tire. Normal hand pressure is sufficient to bring the raw surface into intimate contact with the cleaned area of the tire so as to fix the applique permanently on the tire, although a tool such as a roller may be employed to insure uniform pressure over the entire surface of the applique, satisfactory results being obtained without the use of special tools. When the applique is so affixed to the tire, the applique through its raw surface contacting the cleaned rubber of the tire becomes vulcanized thereto under atmospheric temperature without any heat otherwise having to be employed.

When the applique is so affixed to the tire, the contrast in color between the tire wall which is visible through the apertures and the outer surface of the applique which is normally of a contrasting color, causes the identifying indicia defined by the aperture margins to be strikingly defined and clearly visible. In fact a coating of dust and dirt will not destroy the visible margins of the indicia so that normally the applique does not even require cleaning in order to be able to determine visually the indicia.

The identifying indicia may have unbeveled margins, as indicated in Fig. 2, or the apertures defining the markings or indicia may be made so as to have beveled margins, as indicated in Fig. 4. When so formed, it will be evident that the contrasting colors of the pad laminations showing in these margins will outline the indicia and add to the ease with which they may be read. The marginal color lines of the applique also serve in themselves to indicate a particular ownership of the tire by specific color selections, different color combinations serving to indicate different owners, or possibly different territories of origin.

From the foregoing, it will be evident that the present invention provides an article and a method of inexpensively and conveniently applying a permanent identifying indicia to vulcanized articles such as vehicle tires. It will be further evident that the identifying applique of the present invention may be applied to a vehicle tire either before or after it has been mounted, either deflated or inflated, thus permitting the indicia to be located by applying the applique in a location where it may be easily and conveniently inspected and observed.

The term "rubber" employed herein is intended to include both natural rubber, synthetic rubber, and combinations thereof.

While the invention has been disclosed and described in some detail in the drawing, and the foregoing description, this matter is to be considered as illustrative and not restrictive in character, as other modifications may readily suggest themselves to persons skilled in this art and still coming within the broad scope of the invention, reference being had to the appended claim.

The invention claimed is:

An identification applique to be applied to tires comprising a pad formed by a series of rubber laminations of contrasting color, said pad being provided on one of its faces with a vulcanizable rubber latex coating, said coating enabling said pad to be secured at a selected location on a tire surface by application of pressure on the pad, said pad being provided with a beveled border and identifying perforations of desired configuration, whereby when said applique is mounted on a tire surface the contrasting colors of said laminations outline the margins of said applique, the readability of said identifying perforations being insured by the contrast in color between the outer laminations and the tire surface visible through the perforations.

References Cited in the file of this patent

UNITED STATES PATENTS

| | | |
|---|---|---|
| 232,965 | Hastings | Oct. 5, 1880 |
| 1,876,432 | Phillips | Sept. 6, 1932 |
| 2,391,539 | Avery | Dec. 25, 1945 |
| 2,511,953 | Tallman | June 20, 1950 |

FOREIGN PATENTS

| | | |
|---|---|---|
| 635,091 | Great Britain | Apr. 5, 1950 |